Aug. 13, 1957     S. P. EDWARDS ET AL     2,802,717
PREPARATION OF THIOPHOSPHORYL CHLORIDE
Filed Sept. 10, 1952
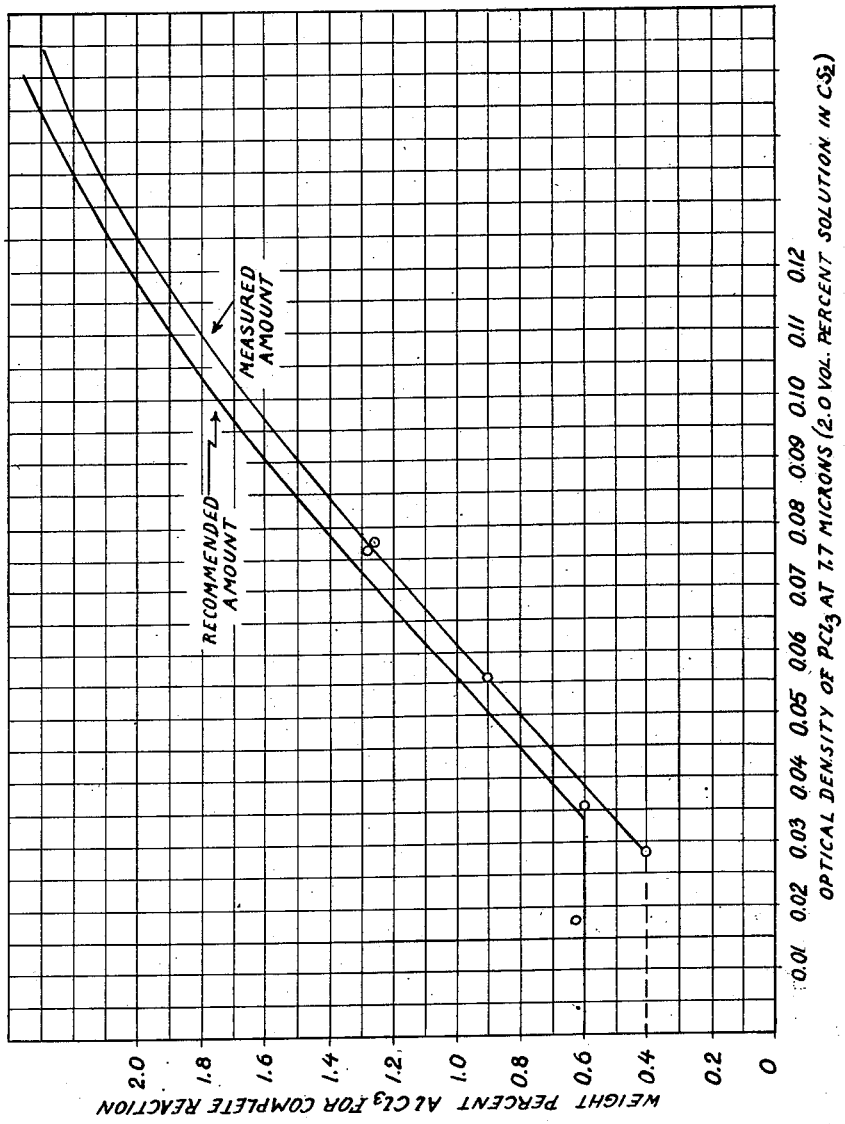
INVENTOR.
Stephen Paul Edward
Oscar H. Johnson
BY Sherman K. Reed
Stanley F. Wilson
Pollard & Johnston
ATTORNEYS

United States Patent Office 2,802,717
Patented Aug. 13, 1957

2,802,717

PREPARATION OF THIOPHOSPHORYL CHLORIDE

Stephen Paul Edwards, St. Albans, Oscar H. Johnson, South Charleston, and Sherman K. Reed, St. Albans, W. Va., and Stanley F. Wilson, East Haven, Conn., assignors to Food Machinery and Chemical Corporation, New York, N. Y., a corporation of Delaware Application September 10, 1952, Serial No. 308,806

2 Claims. (Cl. 23—14)

This invention relates to the production of thiophosphoryl chloride, $PSCl_3$.

Thiophosphoryl chloride has become important as a chemical intermediate in the manufacture of many chemical compounds. Commercial methods of producing this product have involved the heating of equimolecular quantities of phosphorus trichloride and sulfur to temperatures above 130° C., preferably above 180° C., which processes required carrying out the reaction in closed vessels under superatmospheric pressure.

When attempts are made to produce thiophosphoryl chloride by the reaction of phosphorus trichloride and sulfur at atmospheric pressures by the use of an efficient catalyst, the reaction has been difficult to control because of the violence of the reaction even when only a slight excess of catalyst is used; also the production of a pure end product meeting the requirements of present industrial processes has been difficult, especially when production from commercial grades of phosphorus trichloride and sulfur is attempted.

In an article entitled "A new method for the convenient and rapid preparation of phosphorus sulfochloride" by F. Knotz, Osterr. Chem-Ztg. 50, 128–9, 1949, a process is described for the production of thiophosphoryl chloride by the reaction of sulfur and phosphorus trichloride utilizing anhydrous aluminum chloride as a catalyst. The article states that no, or only slight, reaction occurs when finely divided $AlCl_3$ is used in amounts of less than 2 grams per 100 grams of $PCl_3$ even with prolonged refluxing, but that if larger amounts of $AlCl_3$ are used, violent reaction occurs which can be explosive.

We attempted to carry out the reaction described in this article using 2% of the aluminum chloride as a catalyst and found that on a commercial scale, the reaction was difficult to control and led to the production of an impure grade of thiophosphoryl chloride which will not meet the normal purity specifications for this material. When the ordinary commercial grade of trichloride was used the reaction sometimes would not proceed to completion and when nearly pure phosphorus trichloride was used the reaction sometimes proceeded with uncontrollable velocity.

An object of our invention is to produce relatively pure, commercially acceptable thiophosphoryl chloride in high yields by a process involving the reaction of technical phosphorus trichloride and sulfur at atmospheric pressure in the presence of a catalyst without the necessity for special or supplementary purification steps to remove any excess catalyst or other contaminants from the thiophosphoryl product obtained.

Another object of our invention is to provide such a process which will be easy to control and free of the dangers inherent in prior processes of this type, and which will produce with certainty a product of the required purity.

We have discovered that the amount of a given catalyst necessary to produce high yields of thiophosphoryl chloride by the reaction of equimolecular quantities of phosphorus trichloride and sulfur at elevated temperatures varies with the amount of impurities in the phosphorus trichloride, and that an end product of good purity and substantially free of catalyst can be obtained provided the technical phosphorus trichloride used is sufficiently low in impurity content and provided also the amount of catalyst used is carefully limited in relation to the amount of said impurities.

The presence of an excessive amount of aluminum chloride in the thiophosphoryl chloride product has been found to cause catalytic decomposition of part of the thiophosphoryl chloride, thereby causing further contamination of the product and rendering it more unfit for commercial acceptance. The presence of an excess of the catalyst also results in distillation of aluminum chloride and in the decomposition of part of the thiophosphoryl chloride during dry point determination, and a boiling test on such products will reveal a dry point above 125° C., which property will not meet the normal purity test (a boiling range of 120°–125° C.). The presence of aluminum chloride in any appreciable excess, therefore, would interfere with the direct use of thiophosphoryl chloride products and would require further purification before marketing or before use.

We have also discovered that the reaction between phosphorus trichloride and sulfur in the presence of a catalyst to produce thiophosphoryl chloride can be successfully controlled with ease if the sulfur is dissolved or suspended in thiophosphoryl chloride and heated to approximately the reaction temperature in the presence of the catalyst, and the phosphorus trichloride added to the heated mixture at a rate which maintains the reaction temperature.

Various other objects and advantages of our invention will appear as this description proceeds.

The reaction of phosphorus trichloride and sulfur at elevated temperature to produce thiophosphoryl chloride is exothermic and in the production of commercial quantities must be controlled so as to avoid undue rapidity and violence. As a safety measure, the apparatus used in the production is preferably purged with carbon dioxide before starting operation and an atmosphere of such gas or other non-reactive gas is maintained in the apparatus during production.

The usual impurities in technical phosphorus trichloride, $PCl_3$, are phosphorus oxychloride, $POCl_3$, and phosphorus pentachloride, $PCl_5$. These compounds appear to form complexes with catalysts such as aluminum chloride, and as a result, when commercial grades of phosphorus trichloride are reacted a substantial part of the catalyst becomes deactivated.

In the process of the present invention, the amount of catalyst is very carefully proportioned in relation to the amount of impurities present such that when part of the catalyst is deactivated by the impurities, an amount remains which is just adequate to bring about optimum reaction of the phosphorus trichloride and sulfur. A slight excess of catalyst, however, over that indicated by test, may be used in commercial operations, but merely to insure complete reaction.

We have found that with freshly purified phosphorus trichloride, as little as 0.39% of aluminum chloride catalyst, based upon the amount of phosphorus trichloride used, will bring about a complete conversion to thiophosphoryl chloride, and that with a relatively pure, technical phosphorus trichloride, approximately 0.9 gram of anhydrous aluminum chloride per 100 grams of phosphorus trichloride reacted is sufficient to produce a 97%–98% yield of thiophosphoryl chloride and leave substantially no excess catalyst in the product. By regulating the amount of catalyst in relation to the amount of such impurities present in the phosphorus trichloride, substantially complete reaction between the phosphorus trichloride and sulfur is effected, and a high yield of thiophosphoryl chloride is obtained.

While the amount of these impurities in the phosphorus trichloride may be determined in various ways, a convenient method is to measure the optical density of a standard strength solution of phosphorus trichloride to infrared light of a given wave length. For this purpose there may be used a recording Beckman IR-2 spectrometer made by Beckman Instruments, Inc., which produces a graph of wave length versus percentage absorption, or any other type of spectrometer providing similar measurements, may be used.

The method used for calculation of optical density is called the base line technique or method of intercepts. It is well known to those skilled in analysis by infrared spectra and is described in detail, but for more complicated cases, in M. C. Mellon's "Analytical Absorption Spectroscopy" published by John Wiley & Son, Inc., New York (1950), pages 511–512, and N. Wright, Industrial and Engineering Chemistry, Analytical Edition, 13, 1 (1941). Optical density as used in spectrographic work is defined as a number proportional to the concentration of absorbing agent present in the solution being measured.

The figure is a graph prepared by us indicating the weight percent of aluminum chloride to be employed as catalyst in the reaction herein described at the measured optical density of the phosphorus trichloride used.

In the use of an infrared spectrophotometer to measure the impurities in a solution of phosphorus trichloride, if the percentage of light transmitted by the solution under examination is plotted as the ordinate versus the wave length as the abscissa, a minimum percentage transmission will be observed at 7.7 microns wave length and if the two adjacent maximum percentages of light transmitted at adjacent higher and lower wave lengths are noted and a line is drawn tangent to the two maxima, the intersection of this line with the 7.7 microns line determines the average maximum percentage of light transmitted. The optical density is then determined as $$Log_{10} \frac{\text{maximum percentage transmission}}{\text{minimum percentage transmission}}$$

Thus, if the maximum percentage transmission is determined as 88% and the minimum as 73.9%, the optical density will be $$Log \frac{88}{73.9} = 0.076$$

which, according to the graph of the figure will require 1.25% of aluminum chloride as a catalyst.

Other methods of optical density measurements by the use of an infrared spectrophotometer will be obvious to persons skilled in the use of infrared analysis.

We have found that if the phosphorus trichloride to be used is measured by taking the optical density of a standard solution, such as 2.0 volume percent of the phosphorus trichloride in carbon bisulfide at 7.7 microns wave length, the calculated readings described above indicating absorption are proportional to the concentration of phosphorus oxychloride and phosphorus pentachloride impurities in the said sample of phosphorus trichloride. By preparing a graph of infrared absorption at a specific wave length characteristic of phosphorus pentachloride and phosphorus oxychloride, but not phosphorus trichloride, versus catalyst requirements of tested samples, the catalyst requirements for a given lot of phosphorus trichloride of unknown impurity can be readily determined by infrared analysis of said lot and application of the previously found data as represented, for example, by said graph. By the use of a graph such as shown in the figure, the weight percent of aluminum chloride catalyst necessary for complete reaction may be readily ascertained.

The absorption of infrared light by phosphorus oxychloride and phosphorus pentachloride at 7.7 microns wave length is relatively large as compared with the absorption of phosphorus trichloride at the same wave length, and we prefer, therefore, to measure the absorption and hence determine the catalyst requirements of the phosphorus trichloride by measuring the absorption of a standard solution at this particular wave length. It will be understood, however, that other wave lengths may be used and that the graph of the figure is only illustrative of a convenient method of determining catalyst requirements.

Other methods of determining the amount of impurities and, therefore, the amount of catalyst needed, may be used, such as chemical analyses, dry point determination, experimental production or the like.

In the said graph of the figure the abscissas indicate the infrared light transmitted by a solution of 2.0 volume percent of phosphorus trichloride in carbon bisulfide as calculated by the method described above at 7.7 microns wave length with an infrared spectrophotometer and the ordinates indicate the weight percent of aluminum chloride catalyst required for complete reaction of the measured sample with sulfur to produce thiophosphoryl chloride. The lower plotted line indicates the measured amount of aluminum chloride catalyst required and the upper plotted line indicates the amount of catalyst recommended which is a slight excess over that indicated as required by the particular lot of phosphorus trichloride being used.

The optical density test may be used not only to determine the amount of catalyst to be employed but also to determine if the phosphorus trichloride is sufficiently low in impurity content to bring about the production of adequately pure thiophosphoryl chloride in highest or optimum yields. Technical phosphorus trichlorides having an optical density of not more than .10 under said test are satisfactory. The amount of aluminum chloride catalyst required is appreciably less than two percent of the weight of the reactants.

For convenience in reference hereafter and in the claims, the foregoing method of determining the recommended, optimum amount of catalyst, involving the measurement of optical density by infrared spectrophotometry, will be termed "catalyst requirement evaluation."

If ordinary commercial phosphorus trichloride only is available, then it must first be purified, by any suitable means, to reduce the impurity content to a level where the partially purified material obtained meets the above test. Partially purified or technical grades of phosphorus trichloride, however, ordinarily can be purchased from the producers of the commercial grade.

*Example 1*

The optical density of a lot of phosphorus trichloride to be used was measured by the "base line technique" or method of intercepts at 7.7 microns wave length with an infrared spectrophotometer and was found to be 0.078. By use of the graph of the figure, the amount of aluminum chloride to be used was found by catalyst requirement evaluation to be 1.26% of the weight of the phosphorus trichloride.

A mixture of 32.4 grams of sulfur, 1.73 grams of anhydrous aluminum chloride, and 43 grams of thiophosphoryl chloride was heated to 80° C. with stirring in a three-necked flask equipped with reflux condenser, vapor thermometer, stirrer, calibrated addition funnel, and a thermometer well. External heating was discontinued and 137.5 grams of phosphorus trichloride was added at such a rate that the temperature of the reaction mixture was gradually raised as a result of the heat liberated by the reaction. Completion of the reaction was indicated by a reflux temperature of 125° C. The thiophosphoryl chloride was distilled from the flask and a 98% yield of clear product of high quality was obtained.

The boiling range of thiophosphoryl chloride is 120–

125° C., the melting point of sulfur is 112.8° C. and the boiling point of phosphorus trichloride is 73–76° C. We have found, therefore, that the reaction proceeds easier and under better control if the required amount of sulfur and catalyst are suspended in thiophosphoryl chloride and the mixture or suspension heated to 80° C. or higher with stirring before the phosphorus trichloride is added, and that the phosphorus trichloride should be added at a rate which provides a gradual rise in temperature. If an increase in temperature suddenly occurs, the addition of phosphorus trichloride is suspended until the heat liberated has dissipated, and then further addition is made. In this way it is possible to control the rate and temperature of the reaction readily, regardless of the size of the batch being reacted.

Example 2

A 100 gallon steam-jacketed kettle equipped with a reflux condenser, stirrer, feed line, addition opening, discharge line, etc., was used.

By the catalyst requirement evaluation method, the optical density of two drums of phosphorus trichloride was measured by the "base line technique" or method of intercepts at 7.7 microns wave length with an infrared spectrophotometer to ascertain the catalyst requirements according to the graph of the figure and were estimated to be 1.22% and 1.26%. They were also found by experiment to be 1.28% and 1.26% respectively.

The entire system was flushed with carbon dioxide, and a purge of such gas at a slow rate was continued throughout the actual operation at a slow rate.

The raw materials, added through the addition opening of the kettle, consisted of 171 lbs. of sulfur (5.21 moles plus 1% excess), 9.3 lbs. of aluminum chloride (1.3% of the weight of the phosphorus trichloride) and 119 lbs. of thiophosphoryl chloride. An additional 160 lbs. of thiophosphoryl chloride was added through the feed line, making a total of 279 lbs.

The kettle contents were heated to 95° C. and the agitator was started. External heating by means of steam in the jacket was discontinued. When the pot temperature was at 88° C., the addition of phosphorus trichloride was begun. The addition was continued at such rate that the temperature of the reaction mixture gradually increased at the point of measurement in the particular apparatus to 126° C. by the time the total amount of 716 lbs. (5.21 mols) of phosphorus trichloride was added. The reaction mass was refluxed for 20 minutes to assure that all phosphorus trichloride had been flushed from the horizontal passes of the condenser and into the condensate trap or kettle. The contents of the condensate trap were then removed and returned to the kettle through the feed line. The reaction mixture was heated under a condenser until the vapor temperature read 120° C. at which point condensate was allowed to pass through a filter and was collected in drums. No effort was made to collect that part of the product which boiled below 120° C.

The total yield of product was 1078 lbs. or 91%, based upon the phosphorus trichloride used.

After the kettle was vented, water was added to the residue and the contents boiled to decompose any thiophosphoryl chloride remaining in the system and to drive off hydrogen chloride after which the residue was discharged from the kettle.

Example 3

A mixture of 32.4 grams (1.00 mole plus 1% excess) of sulfur, 1.0 gram of aluminum bromide (0.75% of the phosphorus trichloride) and 43 grams of thiophosphoryl chloride, 30% of the phosphorus trichloride) was heated to 90° C. with stirring in a three-necked round-bottom flask equipped with a reflux condenser, vapor thermometer, stirrer, calibrated addition funnel and a thermometer well. External heating was discontinued and 137 grams (1 mol) of phosphorus trichloride was added at such rate that the temperature of the reaction mixture was gradually raised as a result of the heat liberated by the reaction. The amount of aluminum bromide added was insufficient so that the reaction did not proceed to completion. The reaction was continued by adding more aluminum bromide and finally completed, as evidenced by a reflux temperature of 124° C., after a total of 2.8% of aluminum bromide had been added.

In addition to aluminum chloride and aluminum bromide, other catalysts such as ferric chloride, etc. may be used. Since a much larger amount of ferric chloride is required, its use is undesirable for commercial operations. Aluminum chloride is the preferred catalyst.

The technical phosphorus trichlorides meeting the optical test herein described contain up to about two percent impurities composed of either phosphorus oxychloride or of phosphorus pentachloride or of mixtures of the two.

While we have set forth certain theories herein, it will be understood that we do not wish to be bound by these theories. Also various modifications and changes may be made in the procedures herein described without departing from the spirit of our invention or the scope of the following claims.

We claim:

1. A process for the production of thiophosphoryl chloride comprising preparing a liquid mixture containing an approximately stoichiometric proportion of sulfur and an effective proportion of aluminum chloride catalyst in thiophosphoryl chloride, agitating and heating said mixture to a temperature above about the boiling point of phosphorus trichloride, adding an approximately stoichiometric proportion of phosphorus trichloride to said mixture at a rate adapted to maintain the temperature between about the boiling point of phosphorus trichloride and the boiling point of thiophosphoryl chloride, maintaining said temperature of the reaction mixture until the reaction is substantially complete, and recovering the thiophosphoryl chloride by distillation from the reaction product, said effective proportion of aluminum chloride catalyst corresponding to the optical density of the phosphorus trichloride used, as shown in the figure.

2. The process of claim 1 wherein the phosphorus trichloride used has an optical density of not more than 0.10 at 7.7 microns (2.0 volume percent solution in carbon disulphide).

References Cited in the file of this patent

UNITED STATES PATENTS

| | | |
|---|---|---|
| 1,914,750 | Marsh | June 20, 1933 |
| 2,575,316 | Jonas et al. | Nov. 13, 1951 |
| 2,591,782 | Cook | Apr. 8, 1952 |